Figures 1, 2, 3:
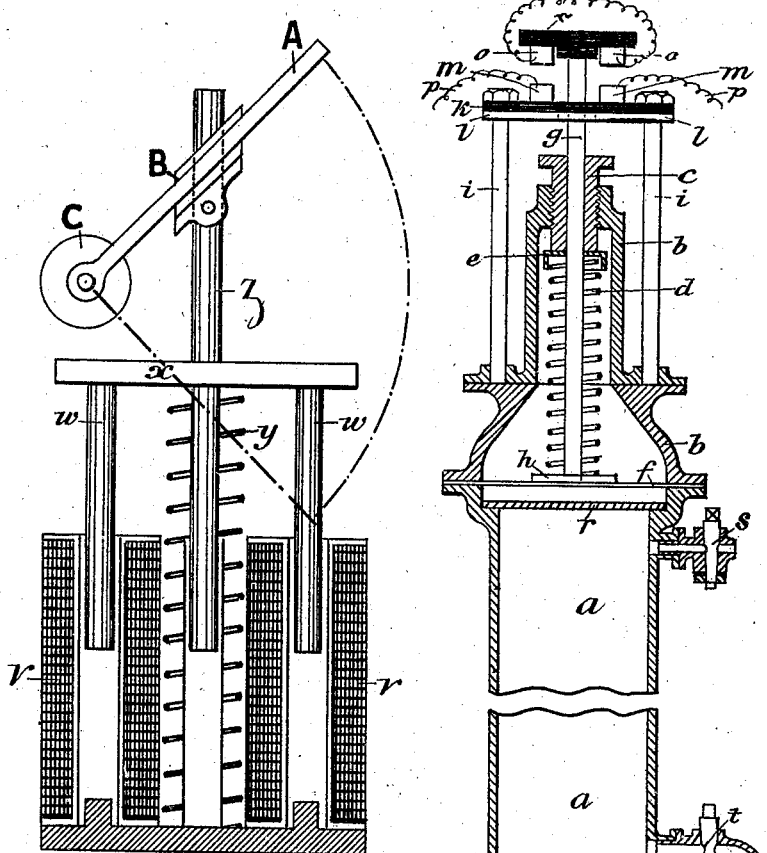

No. 805,950. PATENTED NOV. 28, 1905.
R. J. W. GRASSET.
GOVERNOR FOR MARINE ENGINES.
APPLICATION FILED JAN. 10, 1905.

Witnesses

Inventor
Rodolphe Jean William Grasset

UNITED STATES PATENT OFFICE.

RODOLPHE JEAN WILLIAM GRASSET, OF SOUTH YARRA, VICTORIA, AUSTRALIA.

GOVERNOR FOR MARINE ENGINES.

No. 805,950.  Specification of Letters Patent.  Patented Nov. 28, 1905.

Application filed January 10, 1905. Serial No. 240,434.

*To all whom it may concern:*

Be it known that I, RODOLPHE JEAN WILLIAM GRASSET, mechanical engineer, a citizen of the Republic of Switzerland, residing at No. 10 Railway Place, South Yarra, in the county of Bourke, in the State of Victoria, in the Commonwealth of Australia, have invented a certain new and useful Improved Electrical Hydropneumatic Governor for Marine Engines, of which the following is a specification.

The objects of my invention are the construction of a simple form of electrically-controlled governor which is extremely sensitive in its action upon the engine to which it is applied. The electric power required for controlling the governor may be obtained from a dynamo or other suitable electric source.

Referring to the drawings, which form a part of this specification, Figure 1 is a sectional elevation of pipe *a*, with cap or dome *b*, formed in two parts, as shown. Fig. 2 is a plan of metal ring *r*, and Fig. 3 is a sectional elevation of the solenoid *v* and its connection with the steam-valve lever A in the engine-room.

Similar letters of reference are used to indicate like parts in the several views.

In constructing a governor according to my invention I employ a pipe *a*, fixed in a vertical position contiguous to the keel and in the extreme aftermost part of a screw-steamer. The bottom of said pipe is in open connection with the sea, while the sea-cock *u* remains open. The top of said pipe is carried to such height as may be found necessary and is flanged. The solenoid is placed in the engine-room, the electric connection being carried through the screw-shaft tunnel of a screw-steamer.

The lower portion of cap or dome *b* is provided with a corresponding flange, by which it is bolted to top of pipe *a*. An air-tight elastic india-rubber diaphragm *f* is secured between the said flanges. A thin metal ring *r*, having cross-bars, as shown in Fig. 2, rests upon internal lugs provided for the purpose in pipe *a* in order to prevent said diaphragm being too much depressed. The pipe *a* is provided with an air-cock *s* and drain-cock *t*. The bottom of said pipe is flanged and bolted to a flanged connection, which is fixed as low as possible in the aftermost part of a screw-steamer. The said flanged connection is provided with a sea-cock *u*.

A metal spindle *g*, Fig. 1, having an extended flat base *h*, rests upon center of diaphragm *f*. The said spindle is passed through a spiral spring *d*, placed within the cap or dome *b* and through the threaded gland *c*, said gland being screwed into the upper part of cap or dome *b*. The threaded gland *c*, terminating with cap *e*, is for the purpose of adjusting the compression of spring *d* to suit the depth of water the ship is drawing.

An electric contact-breaker *o o* in two parts, connected by the wire *q*, is carried on the top of spindle *g* by the insulated piece *n*. Said contact-breaker establishes an electric connection with solenoid *v* through the clutches *m m* and the wires *p p*, said clutches being carried on the insulator *k*, fixed to plate *l*, which is carried on the vertical studs *i i*. The magnet or solenoid *v* draws down the cores *w w* with the bar *x* and the vertical rod *z*. The said operation actuates the lever A of throttle or other steam-valve C by the movable joint B. When electric connection is broken by the rising of spindle *g* in dome *b*, the cores *w w* are raised by the action of spring *y*.

The mode of using the apparatus is as follows: By opening the sea-cock *u* the pipe *a*, which forms an air vessel, is placed in direct communication with the sea, and the air in said pipe will be compressed to a pressure due to the draft of water. A depression of the ship's stern causes the water to rise in said pipe and further compress the air acting upon the under side of diaphragm *f*. Said action raises the said diaphragm and spindle *g*, thus breaking the electric contact. When the stern of vessel is lifted, the water in pipe descends, the compression of air is decreased, and the diaphragm *f* is forced down by the action of spring *d*. The said action lowers the spindle *g*, thus closing the electric circuit and so instantly operating the steam-valve C by means of the said solenoid and lever connection. The closing operation is automatic and entirely independent of the accelerated speed of engines.

Having now described my invention, what I claim as new, and desire to secure by Letters Patent, is—

1. In an electrical-controlled hydropneumatic governor for marine engines the combination with the steam-valve thereof of a solenoid having its cores connected directly to the valve and means for energizing the solenoid, said means consisting of an air-chamber in communication with the sea, a diaphragm in the upper part of said chamber, a sliding rod connected with said diaphragm contacts carried by said rod, stationary contacts with which the contacts on the rod are adapted to engage and wires connecting the said stationary contacts with the solenoid.

2. In an electrically-controlled hydropneumatic governor for marine engines, the combination with the steam-valve thereof, of a solenoid having its cores connected directly with said valve and means for energizing the solenoid, said means consisting of an air-chamber in communication with the sea, a diaphragm in the upper part of said chamber, a sliding rod connected with said diaphragm, a spring controlling the upward movement of said diaphragm, means for regulating the pressure of said spring, contacts carried by said rod, stationary contacts with which the before-mentioned contacts are adapted to engage and wires connecting the stationary contacts with the solenoid, substantially as described.

In witness whereof I have hereunto set my hand in presence of two witnesses.

RODOLPHE JEAN WILLIAM GRASSET.

Witnesses:
WILLIAM HENRY CUBLEY,
WILLIAM CONYERS.